UNITED STATES PATENT OFFICE.

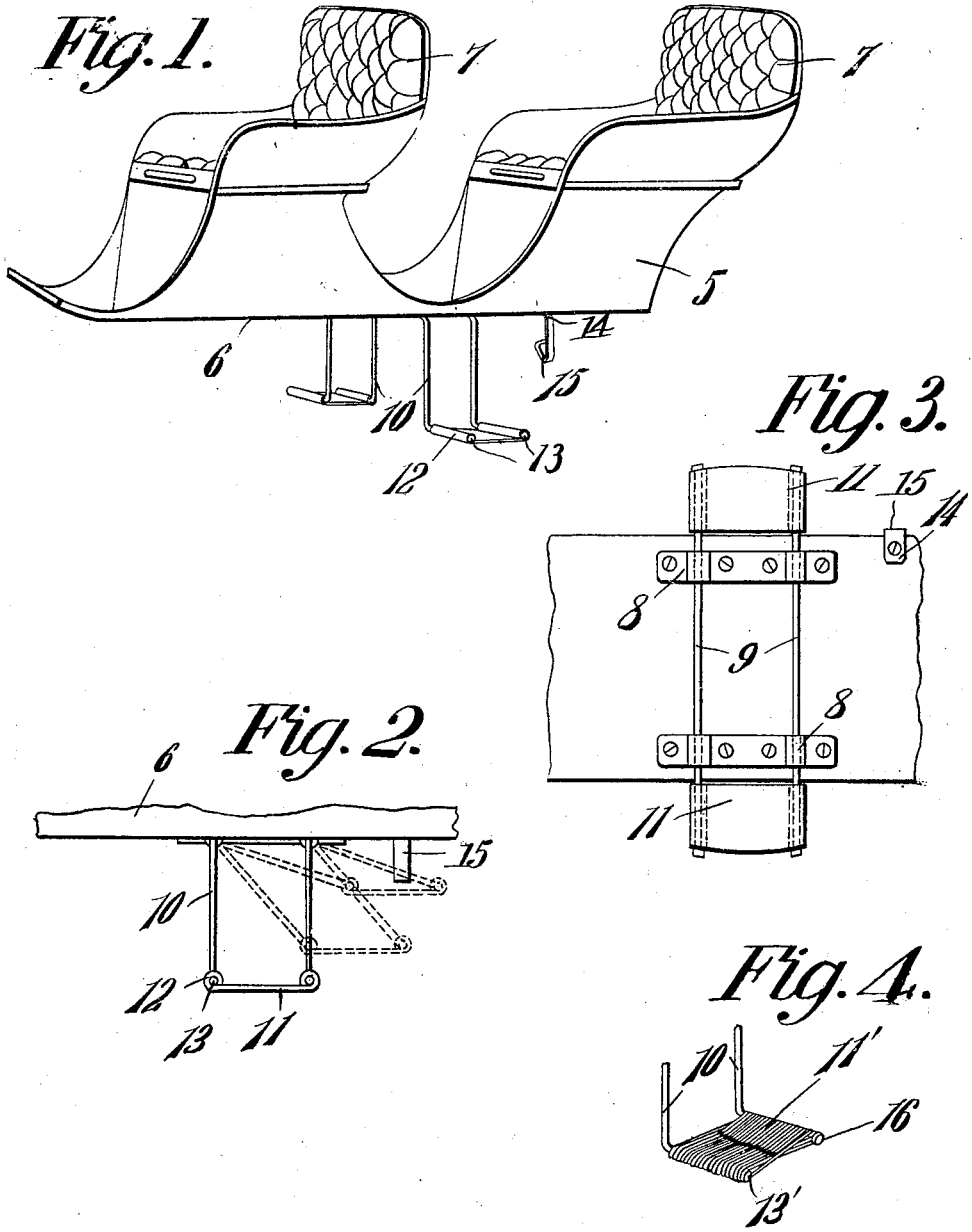

ELIHU MAY, OF MAGEE, MISSISSIPPI.

BUGGY-STEP.

No. 854,753.

Specification of Letters Patent.

Patented May 28, 1907.

Application filed August 7, 1906. Serial No. 329,576.

*To all whom it may concern:*

Be it known that I, ELIHU MAY, a citizen of the United States, residing at Magee, in the county of Simpson and State of Mississippi, have invented a new and useful Buggy-Step, of which the following is a specification.

This invention relates to steps for carriages, wagons and other vehicles and has for its object to provide a step capable of being swung laterally out of the path of rocks, tree-stumps and other obstructions in the road-bed thereby to prevent injury to the step.

A further object is to provide a step the tread surface of which is pivotally mounted on spaced hangers depending from the vehicle-bed whereby the tread-surface may be maintained in a horizontal plane regardless of the position of said step.

A further object is to provide a pair of steps disposed one on each side of the vehicle and movable simultaneously to elevated or inoperative position, and means for locking said steps in inoperative position.

A still further object of the invention is to generally improve this class of devices so as to increase their utility, durability and efficiency as well as to reduce the cost of manufacture.

With these and other objects in view the invention consists in the construction and novel combination and arrangement of parts hereinafter fully described, and illustrated in the accompanying drawings, it being understood that various changes in form, proportions and minor details of construction may be resorted to within the scope of the appended claims.

In the accompanying drawings forming a part of this specification: Figure 1 is a perspective view showing a portion of a vehicle provided with a step constructed in accordance with my invention. Fig. 2 is a side elevation showing in dotted lines the position assumed by the step when the latter is swung upwardly to inoperative position. Fig. 3 is a bottom plan view. Fig. 4 is a detail perspective view illustrating a modified form of the invention.

Similar numerals of reference indicate corresponding parts in all of the figures of the drawings.

The improved step is principally designed for use on carriages, wagons and other vehicles and by way of illustration is shown applied to a carriage of the ordinary construction in which 5 designates the body portion, 6 the bed and 7 the seats. Extending transversely across the bed of the vehicle and journaled in suitable brackets or bearings 8 is a pair of spaced rock-shafts 9 the opposite ends of which are bent downwardly to form depending hangers 10 the ends of which are connected by a strip of metal or other suitable material which forms the tread surface 11 of the step. The opposite ends of the plate forming the tread-surface of the step are curved laterally to form terminal eyes 12 adapted to receive the angular extensions 13 of said hangers whereby the tread-surface is pivotally supported on the hangers so that the tread-surface will always be maintained in a horizontal plane regardless of the position of the step.

By having the hangers mounted for swinging movement on the bed of the vehicle the step may be swung laterally out of the path of rocks, tree-stumps and other obstructions in the road-bed thereby preventing injury to the step. As a means for locking the step in elevated or inoperative position a suitable locking member 14 is secured to the bed of the vehicle on one side of the latter, said locking member being provided with a terminal spring catch 15 adapted to engage the adjacent hanger and thereby lock the step in elevated position.

In Fig. 4 of the drawing there is illustrated a modified form of the invention in which the tread-surface 11' is formed of a continuous length of wire extended transversely across the angular extensions 13' of the hangers, thus presenting a roughened surface for engagement with the foot. The wires forming the tread-surface 11' are threaded alternately over and under arms 13', the latter being provided with enlarged heads 16 which engage the adjacent coils of the wire and thus prevent accidental displacement of the same.

The steps may be made in different sizes and shapes and plated, japanned or otherwise coated to protect the same against the action of the elements.

From the foregoing description it will be seen that there is provided an extremely simple, inexpensive and efficient device admirably adapted for the attainment of the ends in view.

Having thus described the invention what is claimed is:

1. The combination with a vehicle, of spaced shafts journaled on the bed of the vehicle and provided with depending hangers the ends of which terminate in laterally extending arms having enlarged heads, a tread surface interposed between the hangers and the enlarged heads of the arms and forming a pivotal connection between said arms, and a locking member secured to the bed of the vehicle and engaging the adjacent hanger for locking the tread surface in elevated position.

2. The combination with a vehicle, of brackets secured to the bed of the vehicle, spaced shafts journaled in the brackets and provided with depending hangers the ends of which terminate in laterally extending arms having enlarged heads, plates interposed between the hangers and the enlarged heads and having their opposite ends bent to form eyes for the reception of the adjacent arms, and a locking member secured to the bed of the vehicle and adapted to engage one of the hangers for locking both hangers in elevated position.

3. The combination with a vehicle, of brackets secured to the bed of the vehicle, spaced shafts journaled in the brackets and provided with depending hangers the ends of which terminate in horizontally disposed arms, a plate forming a pivotal connection between said arms and having its opposite ends bent to form eyes of the same width as the plate for the reception of the arms, and a locking member secured to the bed of the vehicle and adapted to engage one of said hangers for locking the plate in elevated position.

In testimony that I claim the foregoing as my own, I have hereto affixed my signature in the presence of two witnesses.

ELIHU MAY.

Witnesses:
C. C. ALLEY,
H. G. ROBINSON.